United States Patent
Shen et al.

(10) Patent No.: US 11,361,893 B2
(45) Date of Patent: Jun. 14, 2022

(54) SOFT BODY ROBOTIC DEVICE

(71) Applicant: City University of Hong Kong, Kowloon (HK)

(72) Inventors: Yajing Shen, Kowloon (HK); Xiong Yang, Kowloon Tong (HK); Haojian Lu, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/695,400

(22) Filed: Nov. 26, 2019

(65) Prior Publication Data
US 2020/0168379 A1    May 28, 2020

Related U.S. Application Data

(60) Provisional application No. 62/771,780, filed on Nov. 27, 2018.

(51) Int. Cl.
| | |
|---|---|
| *H01F 7/02* | (2006.01) |
| *H01F 1/42* | (2006.01) |
| *B32B 3/30* | (2006.01) |
| *B32B 5/02* | (2006.01) |
| *C08G 63/08* | (2006.01) |
| *C08J 3/09* | (2006.01) |
| *H01F 41/02* | (2006.01) |
| *D01D 5/00* | (2006.01) |
| *D01F 6/62* | (2006.01) |

(52) U.S. Cl.
CPC .......... *H01F 7/0247* (2013.01); *C08G 63/08* (2013.01); *C08J 3/093* (2013.01); *D01D 5/003* (2013.01); *D01F 6/62* (2013.01); *H01F 1/42* (2013.01); *H01F 41/0253* (2013.01); *D10B 2331/04* (2013.01)

(58) Field of Classification Search
CPC . H01F 7/0247; H01F 7/02; H01F 1/42; B32B 3/30; B32B 5/022; B32B 2307/208
See application file for complete search history.

(56) References Cited

U.S. PATENT DOCUMENTS

| | | | | |
|---|---|---|---|---|
| 6,132,360 | A * | 10/2000 | Halpern | A61N 2/00 128/898 |
| 2007/0156211 | A1* | 7/2007 | Ferren | A61B 5/02007 607/101 |
| 2007/0172651 | A1* | 7/2007 | Miyoshi | D01F 6/84 428/373 |
| 2014/0343598 | A1* | 11/2014 | Johanson | B23Q 1/03 606/200 |
| 2016/0022266 | A1* | 1/2016 | Lukin | A61B 17/1114 606/154 |

* cited by examiner

*Primary Examiner* — Joanna Pleszczynska
(74) *Attorney, Agent, or Firm* — Renner Kenner Greive Bobak Taylor & Weber

(57) ABSTRACT

A soft body robotic device includes a body made at least partly from a polylactic-acid-based material, and a magnetic movement mechanism connected to the body. The magnetic movement mechanism is configured to support movement of the soft body robotic device and to interact with an external magnetic control device for movement of the soft body robotic device.

13 Claims, 5 Drawing Sheets

SOFT BODY ROBOTIC DEVICE

TECHNICAL FIELD

The invention relates to a soft body robotic device, as well as a method for making a soft body robotic device.

BACKGROUND

The fusion of soft materials with conventional robotics where rigid structures are mainly implemented has sparked a wave of vigor and excitement in robotics science and engineering. Owing to their adaptability to sophisticated terrain and safety for human interaction, the introduction of soft materials offers promise to overcome many obstacles inherent in conventional hard robots.

Recently, soft, micro-scale or milli-scale robots have been proposed. These existing robots may potentially be used in in-vivo biomedical applications ranging from enhanced imaging to targeted drug delivery. Nevertheless, these soft robots are still challenging to use. For example, the use of soft structures may provide relatively weak body support, with relatively low locomotion or movement efficiency, small carrying-load capacity, limited obstacle-crossing or navigation ability, etc. These challenges are more severe at harsh operation environments such as humid or wet environments.

SUMMARY OF THE INVENTION

It is an object of the invention to provide a soft body robotic device that is degradable and can provide satisfactory movement performance. It is also an object of the invention to provide a simple and cost effective method for making a soft body robotic device.

In accordance with a first aspect of the invention, there is provided a soft body robotic device comprising a body made at least partly from a polylactic-acid-based material, and a magnetic movement mechanism connected to the body. The magnetic movement mechanism is configured to support movement of the soft body robotic device and to interact with an external magnetic control device for movement of the soft body robotic device.

Preferably, the polylactic-acid-based material comprises a solution containing polylactic acid and a solvent.

Preferably, the solvent comprises chloroform.

Preferably, the body is made entirely from the polylactic-acid-based material.

Preferably, the body comprises electrospun polylactic-acid-based fibers.

Preferably, the magnetic movement mechanism comprises a plurality of magnetic legs extending from the body.

Preferably, the magnetic legs are paramagnetic.

Preferably, the magnetic legs extend generally perpendicular to the body.

The magnetic legs may be unevenly spaced or evenly spaced.

Preferably, the magnetic legs are shaped to taper away from the body.

Preferably, the magnetic legs are made from a polylactic-acid-based material.

Preferably, the polylactic-acid-based material comprises a solution containing polylactic acid, a solvent, and magnetic particles.

Preferably, the solvent comprises chloroform.

Preferably, a ratio of an average length of the magnetic legs to an average spacing between two adjacent magnetic legs is in the range of 1:2 to 2:1. More preferably, the ratio of the average length of the magnetic legs to the average spacing between two adjacent magnetic legs is about 1:1.

Preferably, the soft body robotic device is untethered.

Preferably, the soft body robotic device is degradable.

Preferably, the soft body robotic device is biocompatible.

Preferably, the soft body robotic device is a milli-scale device or a micro-scale device.

Preferably, the body and the magnetic movement mechanism are integrally formed.

Preferably, the magnetic movement mechanism is configured to interact with the external magnetic control device to support discontinuous flap-wave locomotion and continuous inverted-pendulum locomotion of the soft body robotic device.

In accordance with a second aspect of the invention, there is provided a method for making a soft body robotic device, comprising: forming a magnetic movement mechanism for the soft body robotic device; and forming, using a polylactic-acid-based material, a body of the soft body robotic device such that the body is made at least partly from the polylactic-acid-based material.

Preferably, the polylactic-acid-based material comprises a solution containing polylactic acid and a solvent.

Preferably, the solvent comprises chloroform.

Preferably, the forming of the body is such that the body is made entirely from the polylactic-acid-based material.

Preferably, the forming of the body comprises electrospinning the polylactic-acid-based material on the formed magnetic movement mechanism.

Preferably, the forming of the magnetic movement mechanism comprises forming a plurality of magnetic legs for the soft body robotic device.

Preferably, the forming of the magnetic legs comprises: applying a magnetic field, preferably a uniform magnetic field, to a solution containing polylactic acid, a solvent, and magnetic particles, supported on a support plate, to aggregate the magnetic particles; and fixing the clusters of magnetic particles to form the magnetic legs. Preferably, the clusters of magnetic particles each have a length along a lengthwise direction.

Preferably, the magnetic field is applied substantially perpendicular to the support plate.

The magnetic field may be applied such that the clusters of magnetic particles are unevenly spaced or evenly spaced.

Preferably, the magnetic field is applied such that the clusters of magnetic particles are each tapered along the lengthwise direction. The forming of the body may be performed on the fixed, tapered magnetic legs.

Preferably, the magnetic field is applied such that a ratio of an average length of the magnetic legs to an average spacing between two adjacent magnetic legs is in the range of 1:2 to 2:1. More preferably, the ratio is about 1:1.

Preferably, the fixing of the clusters of magnetic particles comprises applying white light to the solution to volatilize the solvent.

Preferably, the method also includes preparing the solution by: dissolving polylactic acid in the solvent under yellow light condition; adding magnetic particles into the polylactic acid and solvent solution; and mixing the magnetic particles with the polylactic acid and solvent solution to form the solution.

Preferably, the solvent comprises chloroform.

Preferably, the soft body robotic device is untethered.

Preferably, the soft body robotic device is degradable.

Preferably, the soft body robotic device is biocompatible.

Preferably, the soft body robotic device is a milli-scale device or a micro-scale device.

In accordance with a third aspect of the invention, there is provided soft body robotic device manufactured using the method of the second aspect.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

The inventors of the invention have devised, through research, experiments, and trials, that legs and/or feet are commonly found in many living animals, including both land animals (e.g., ant, dog, cheetah, etc.) and ocean animals (e.g., starfish, octopus, etc.). Such legs could lift the animal's body from ground as needed, which reduces friction between the body and the ground, promotes high degrees of freedom in locomotion and movement, reduces energy cost, and enhances obstacle-crossing ability. Legged animals usually demonstrate greater adaptability to complex terrain.

The inventors of the invention have also devised, through research, experiments, and trials, that the average length of legs (L) of legged animals is normally 1 to 2 times larger than that of their average foot-to-foot spacing (S). The inventors of the invention have devised that a large L/S ratio is good for locomotion but not good for support; on the other hand, a small L/S ratio is good for support but not good for locomotion. Interestingly, for animals with soft legs or feet such as starfish, centipede, and pillworm, the L/S is typically approximately close to 1 for optimal balance.

Figure 1A:
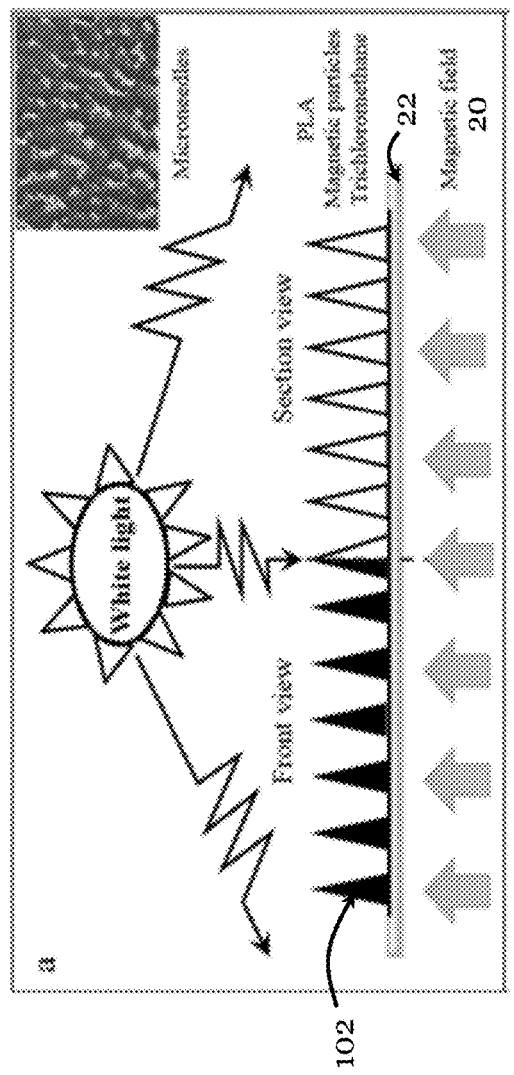
FIG. 1A is a schematic diagram illustrating part of a method for making a soft body robotic device in one embodiment of the invention.
Figure 1B:
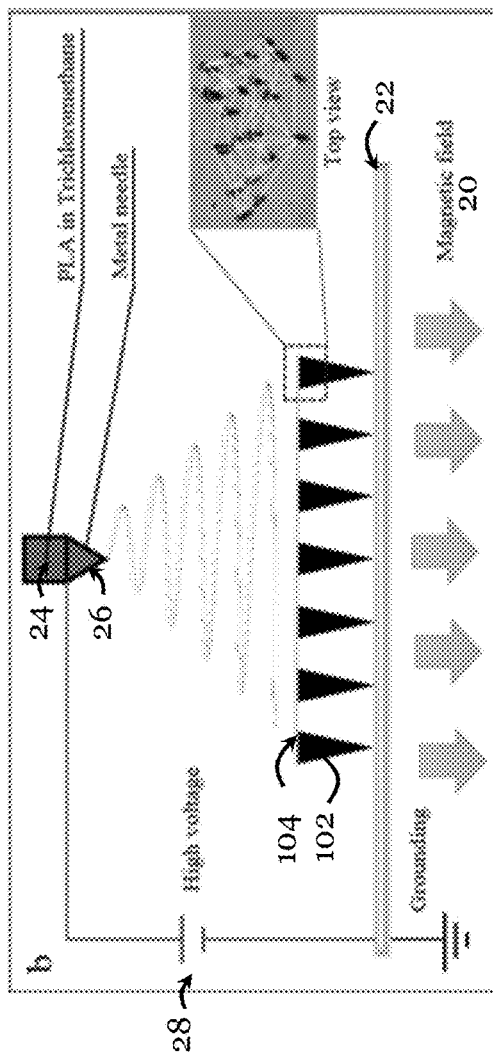
FIG. 1B is a schematic diagram illustrating another part of the method of FIG. 1.

FIGS. 1A and 1B illustrate two steps in a method for making a soft body robotic device in one embodiment of the invention. Basically, the method includes forming a magnetic movement mechanism for the soft body robotic device, and forming a body of the soft body robotic device. In this embodiment, the body is made at least partly from polylactic-acid-based material, such as a polylactic acid and solvent solution. The solvent may be chloroform.

FIG. 1A illustrates forming of the magnetic movement mechanism for the soft body robotic device. In this embodiment, the magnetic movement mechanism is in the form of multiple magnetic legs 102. The method step in FIG. 1A first involves preparing a solution (not shown). The solution is prepared, by dissolving polylactic acid (PLA) in chloroform solution under yellow light conditions, then adding magnetic particles into the resulting solution, and subsequently, mixing the resulting solution uniformly. The yellow light conditions may be provided by a light source arranged to give out yellow light, e.g., light with a wavelength of about 577-597 nm. The average diameter of magnetic particles may in the order of 1-100 μm. In this example, the average diameter of magnetic particles has an average of 10 μm. The method then involves applying the solution to a plate that is made of electric-conductive material and preferably generally flat. The electric-conductive material may be metal. A magnetic field 20, preferably a uniform one, is then applied by an external source to the solution supported on the plate 22. The magnetic field 20 is generally perpendicular to the support plate 22 and hence the solution supported on the support plate 22. The magnetic field can be applied from above or from below the plate 22. Under the action of the applied magnetic field 20, the magnetic particles aggregate to form multiple acicular projections spaced apart from each other. The magnetic field 20 may be applied such that the acicular projections are evenly spaced or unevenly spaced. The acicular projections are each tapered away from the support plate. The magnetic field 20 is preferably applied such that a ratio of an average length of the acicular projections to an average spacing between two adjacent acicular projections is in the range of 1:2 to 2:1, or more preferably, about 1:1. After the acicular projections are formed, the entire assembly is exposed to white light conditions, to volatilize chloroform to fix the acicular projections, to form the magnetic legs 102. The white light conditions may be provided by a light source arranged to give out lights with different wavelengths (about 400-760 nm) combined to provide white or substantially white color. In this embodiment, the legs 102 formed are paramagnetic.

FIG. 1B illustrates forming of the body. Generally, the method step in FIG. 1B involves electrospinning polylactic-acid-based material on the formed magnetic movement mechanism, in this embodiment the magnetic legs 102. The magnetic or paramagnetic legs 102 obtained following the method in FIG. 1 are arranged in order under a uniform magnetic field 20. In FIG. 1B, electrospinning of a solution with polylactic acid and chloroform is performed, directly above the legs 102. Specifically, the container 24 of the polylactic acid/chloroform solution includes a metallic needle 26, which is connected with the support plate 22 through a high potential voltage source 28, such that the needle 26 is at a high potential. The plate 22 is grounded. The electrospining is performed on the broader side of the tapered legs 22. The presence of the magnetic legs 102 provides a local attraction to the spinning so that the spinning joins the individual legs 102 together. After a period of spinning accumulation, the spinning forms a film over the magnetic legs 102. The film, integrally formed with the legs, becomes the body 104 of the soft body magnetic device.

Figure 2:
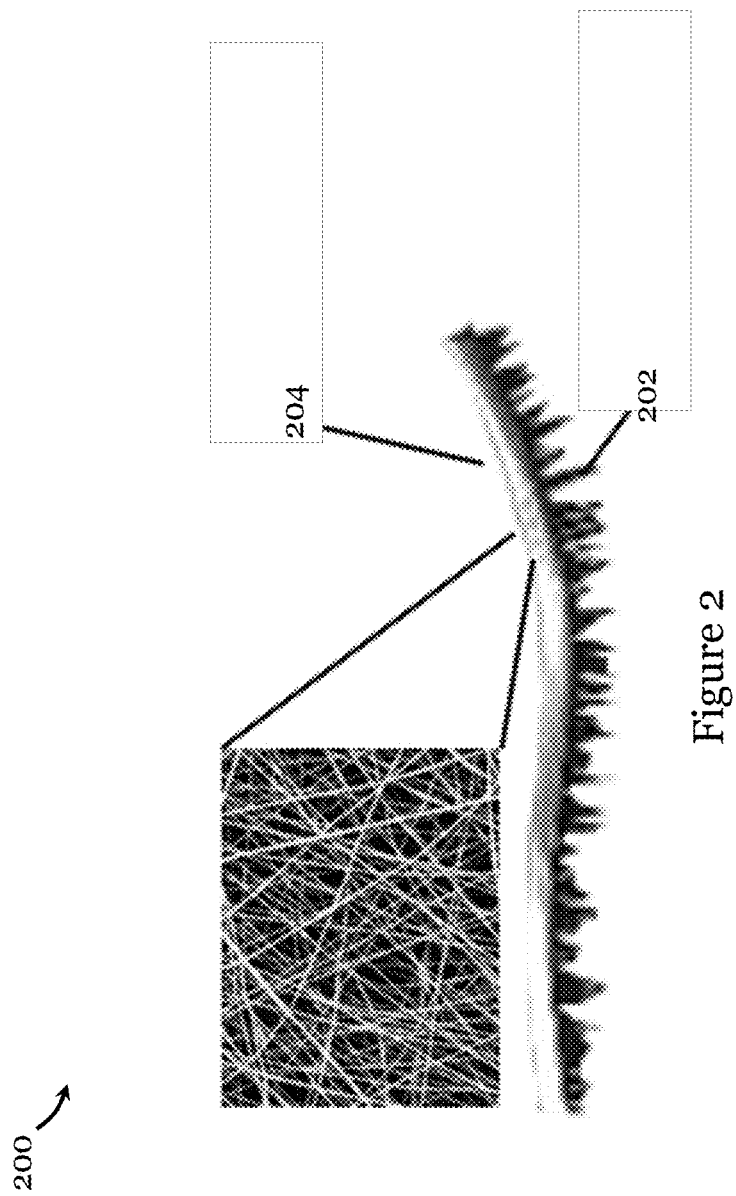
FIG. 2 is a picture showing a soft body robotic device in one embodiment of the invention.

FIG. 2 shows the structure of a soft body robotic device 200, which can be made using the method of FIGS. 1A and 1B. Generally, the soft body robotic device 200 includes a body 204 and a magnetic movement mechanism 202 connected to the body 204. The magnetic movement mechanism 202 is configured to support movement of the soft body robotic device 200 and to interact with an external magnetic control device for movement of the soft body robotic device 200. The body 204 is made at least partly from polylactic-acid-based material, such as a solution containing polylactic acid and a solvent (e.g., chloroform). In this embodiment, the robot 200 includes magnetic movement mechanism in the form of tapered magnetic legs 202, or needles. The body 204 includes electrospun fiber of polylactic acid. The mechanical properties of the magnetic legs 202 made from polylactic acid/chloroform/magnetic particles are not significantly improved, but the paramagnetic properties of the magnetic particles provide magnetic drive for the robot 200. The electrospun fiber body 204 gives the robot 200 a soft deformable body that may readily improve the movement performance of the robot 200. The robot 200 in this embodiment is untethered, degradable, biocompatible, and made small (such as in the form of a milli-scale or micro-scale), making it particularly suitable for in vivo biomedical applications such as drug delivery or surgery.

Figure 3A:
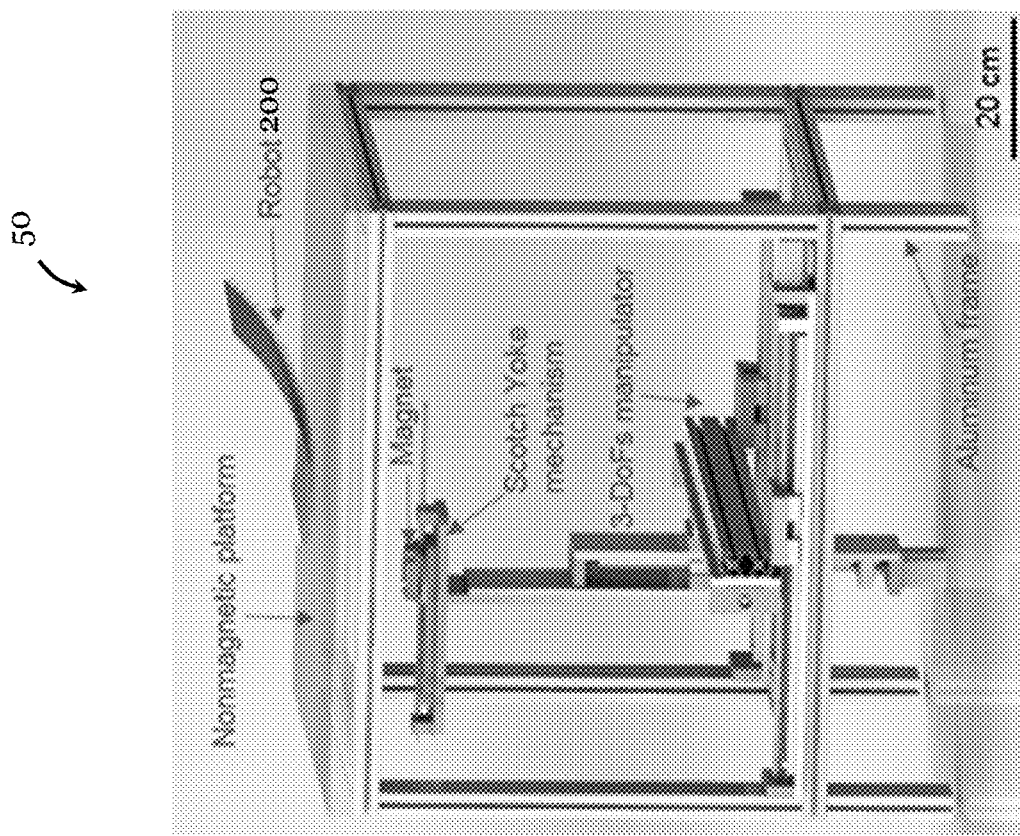
FIG. 3A is a schematic diagram illustrating an external magnetic control device for interacting with the soft body robotic device in one embodiment of the invention.

FIG. 3A shows an external magnetic control device 50 for interacting with the soft body robotic device 200 for controlling the motion of the robot 200. The device includes a frame, made of aluminium, supporting a non-magnetic platform on which the robot 200 can be placed. The frame also supports, below the platform, a 3-DoFs manipulator including three stepper motors configured to move in mutually perpendicular positions. A Scotch Yoke mechanism, with a magnet supported on it, is connected to the manipulator and is adapted for high-speed reciprocating motion. The magnet on the Scotch Yoke mechanism interacts wirelessly with the magnetic movement mechanism (e.g., legs) of the soft body robotic device 200 to control movement of the soft body robotic device 200.

In operation, when a magnetic field is applied to the robot 200, both magnetic torque and pulling force will be generated on the robot 200. Thus, the tapered feet of the robot 200 will align with the direction of magnetic flux, and the robot 200 moves forward displaying various postures, in response to the combined action of the magnetic and pulling forces and interactions.

According to both theoretical analysis and experimental measurement performed on a sample soft robot 200 of FIG. 2, the maximum magnetic torque applied to a single tapered foot is approximately 0.4 nN·m. In contrast, there is no noticeable movement of a like robot without the feet structure, even when the magnetic field is applied up to 200 mT. Moreover, on both wet and dry surfaces, the friction force on the sample soft robot 200 of FIG. 2 is at least 40 folds smaller than one without legs. This significant reduction in the friction force results from the reduced contact area between the robot 200 and the ground (about 5000 folds smaller for the one with legs, compared to the one without). Notably, all these results are achieved without the loss of structural flexibility.

Figure 3B:
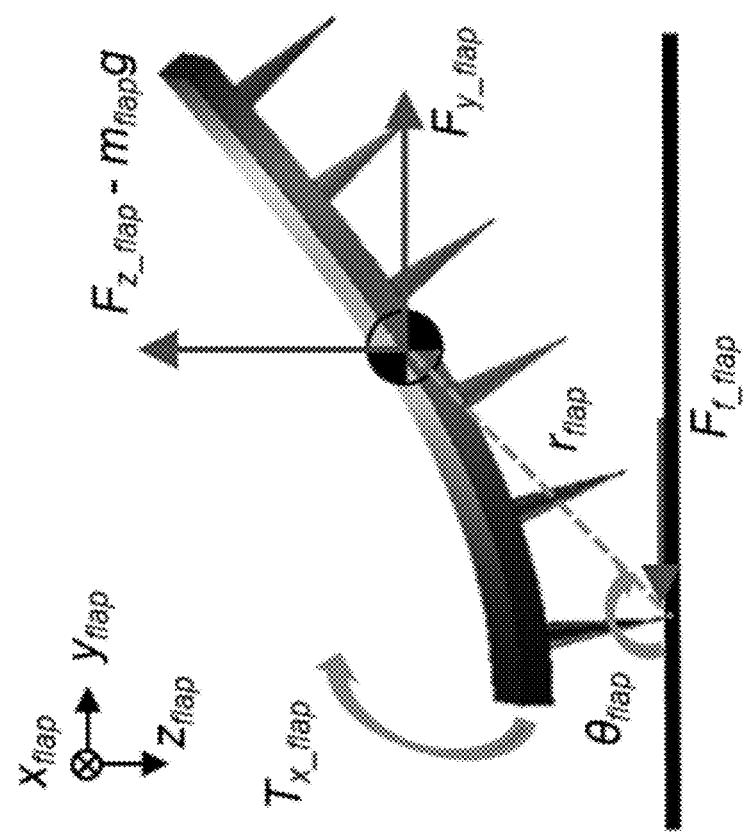
FIG. 3B is an illustration of the dynamic physics model of the soft body robotic device in one embodiment of the invention.

In one example, under the trigger of external magnetic field, for example provided by the external magnetic control device of FIG. 3A, the robot 200 in one embodiment of the invention can achieve a combined multiple locomotion, i.e., the combination of discontinuous flap-wave (DFW) locomotion and a continuous inverted-pendulum (CIP) locomotion. FIG. 3B shows a discontinuous flap-wave mode model for the robot 200. In FIG. 3B, the modelling is restricted to a side-view of the robot 200 in the x-z plane. The robot dynamic relations are developed with several parameters defined.

Figure 4A:
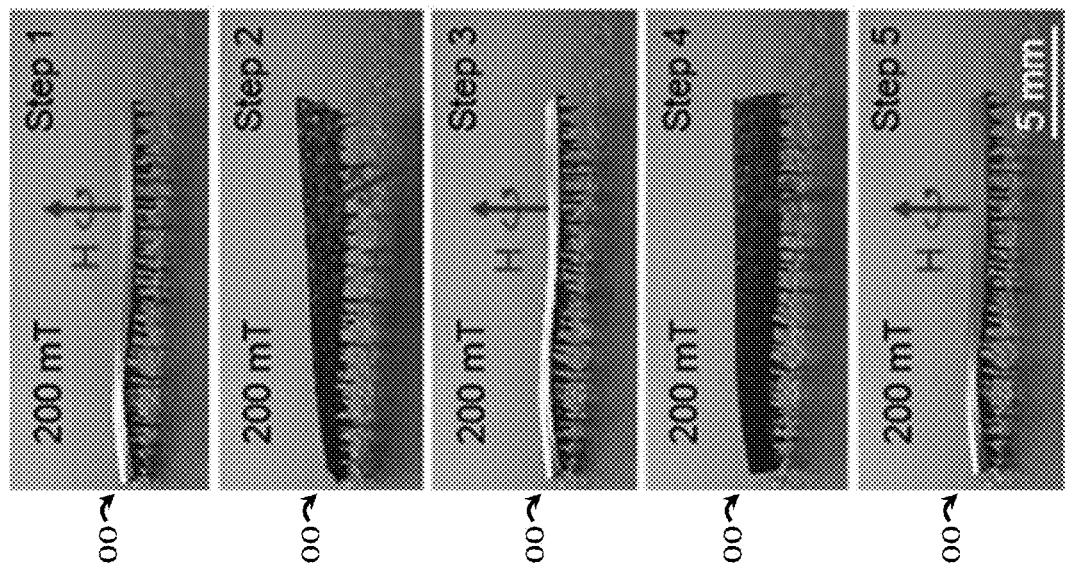
FIG. 4A is a picture, including steps 1 to 5, which illustrates movement of the soft body robotic device in one embodiment of the invention under discontinuous flap-wave (DFW) mode during an experiment.

FIG. 4A illustrates the movement of the robot 200 under DFW mode. In one example, a DFW locomotion of the robot can be generated by moving an external control magnet with an "O" trajectory in the y-z plane. Initially, when the external control magnet is located underneath the robot, the feet of robot stick on the ground. As the external control magnet is moved upper and forward, the front feet rise in alignment with the magnetic flux and the robot moves forward step by step. After the external magnetic field is off, e.g., by removing the external control magnet, or in the case of electromagnet, stopping supply of electric current, the robot's feet are in touch with the ground again. Such a flap-wave locomotion is similar to the typical "stick-slip" movement widely used in piezo actuation at micro/nano scale.

Figure 4B:
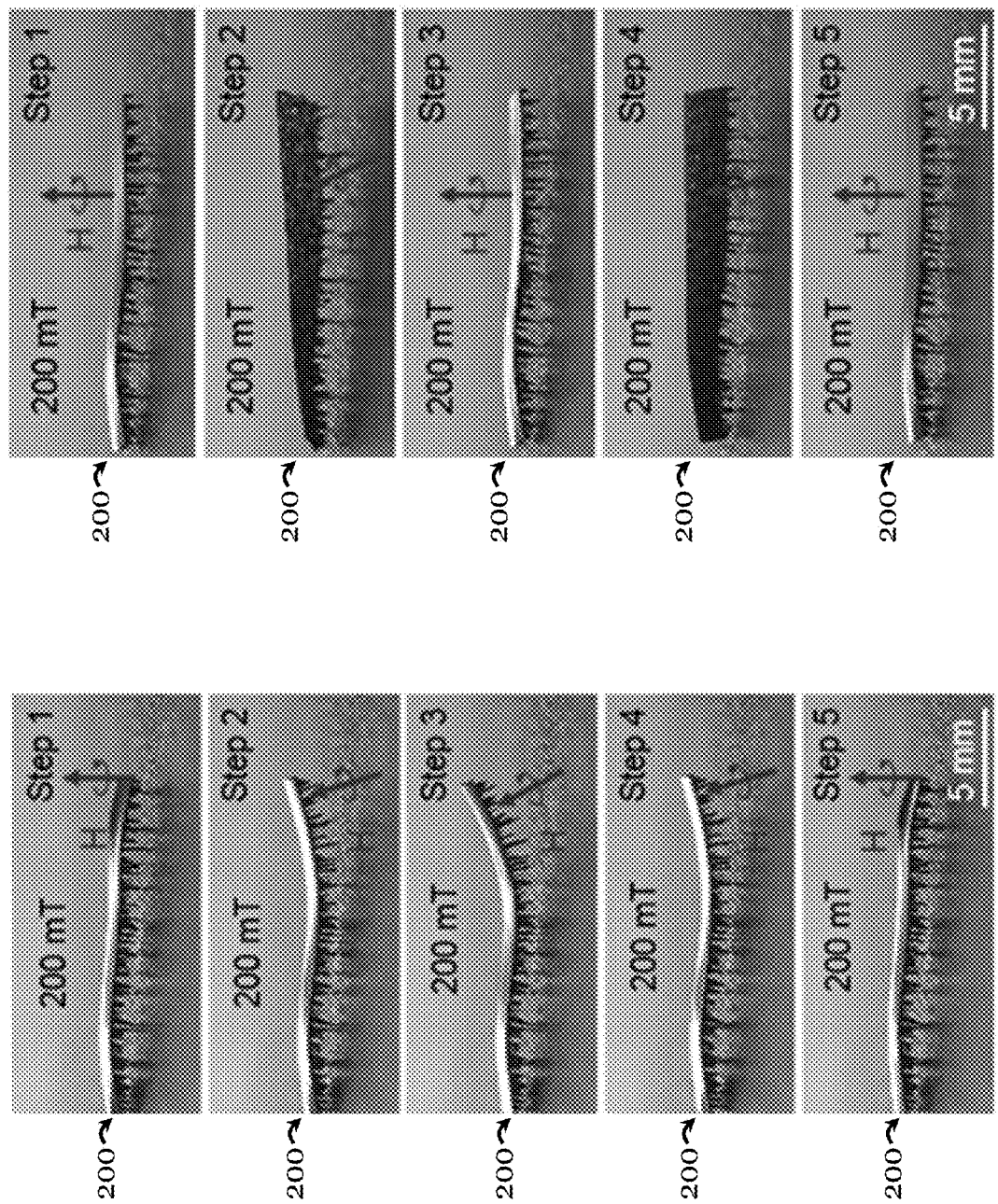
FIG. 4B is a picture, including steps 1 to 5, which illustrates movement of the soft body robotic device in one embodiment of the invention under continuous inverted-pendulum (CIP) mode during an experiment.

FIG. 4B illustrates the movement of the robot 200 under CIP mode. In one example, the use of magnet with a "S" trajectory in the x-y plane results in a CIP locomotion. In this kind of locomotion, the magnetic bar is programmed to move to the left and right directions alternately, meanwhile maintaining a forward movement. In response to the magnetic flux, the robot 200 exhibits a continuous locomotion-like human walking, characterized by the alternate rise-up and continuous forward motion.

The experimental results further demonstrate that the CIP locomotion has a higher locomotion efficiency than that of the DFW locomotion, although the latter usually gives a better obstacle crossing ability. In terms of the stride frequency, the robot 200 in the present embodiment can switch twice in one gait cycle continuously at the CIP mode, whereas only once at the DFW mode. In addition, the locomotion efficiency at the CIP mode is twice higher than that of the human's walking.

To demonstrate the versatility of the robot 200 in this embodiment, a sample robot of the embodiment was tested in several harsh environments, including wet slippery surfaces, with heavy loading, and with high sloppy obstacles. It has been recognized that locomotion on slippery surfaces is challenging due to the presence of sticky water layer. In the robot 200 of the present embodiment, the tapered feet lead to small contact area with the underlying substrate. As a result, on both dry and wet environments, the friction forces between the robot 200 and ground are reduced by more than 40 times (compared to a like robot without legs). Also, the tapered feet ensure a point contact to ground even when heavy loads are applied.

Figure 5:
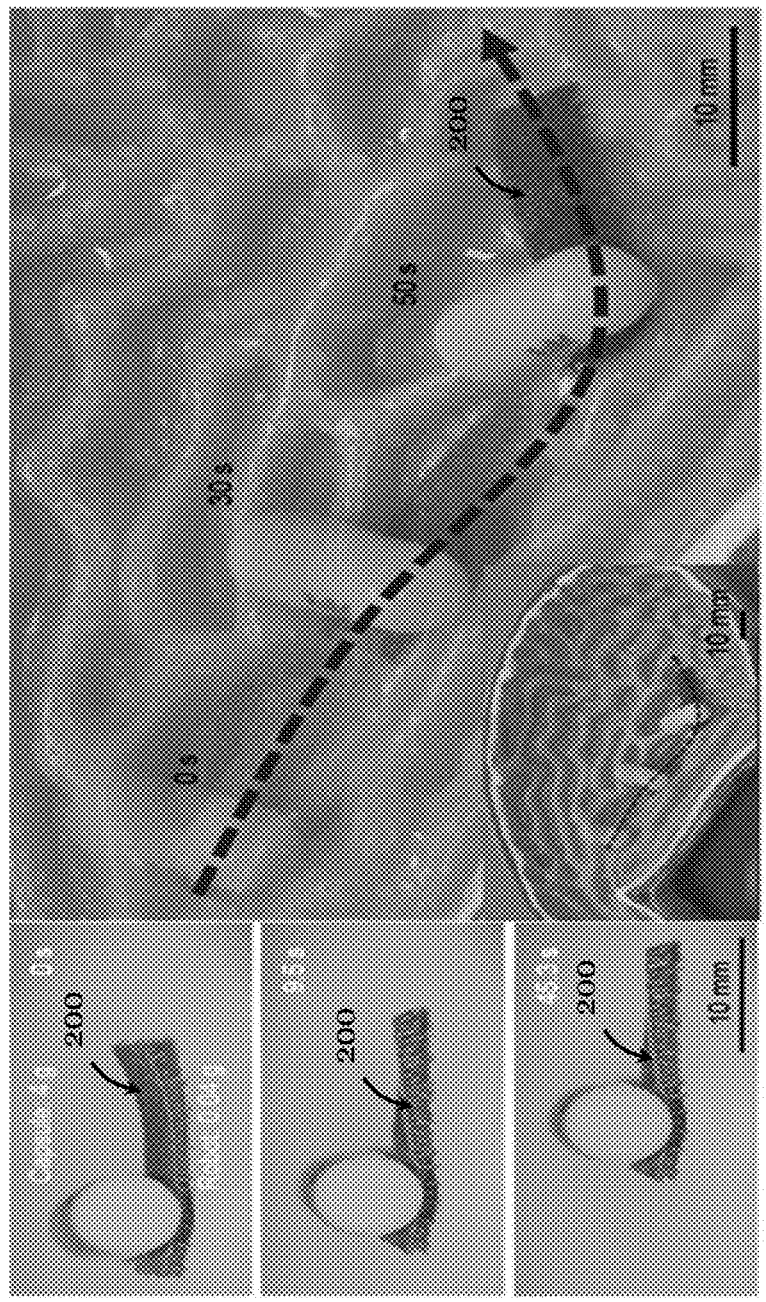
FIG. 5 is a picture showing movement of the soft body robotic device in one embodiment of the invention in a rugged surface during an experiment.

FIG. 5 demonstrates the movement performance of the robot 200 of the embodiment carrying a medical tablet, on a human stomach-like structure (isolated, wet surface) that mimics the in-vivo biomedical environment. The sample stomach-like structure is 1.5-6.8 mm deep and 2.4-6.2 mm wide. A medical tablet (4 g) was adhered on the robot body. The tablet was about 100 times heavier than the robot. As shown in FIG. 5, the robot of about 0.04 g (39.4 mg) can move 32 mm in 50 s at such a harsh in-vivo simulated environment, meanwhile carrying a medical tablet, a capsule filled by Pb beads, about 4 g, which is 100 times heavier than the robot itself. Under a magnetic drive frequency of 1 Hz, the robot can move 8 mm in 45 s. Such a carrying capability is comparable to an ant, i.e., one of the strongest Hercules in nature, and stronger than most animals. Moreover, the flexible feet serve as both hanger and damper in locomotion, leading to mutual enhancement in stability and wall climbing ability. As the result shows, the robot of the embodiment can move 32 mm in 50 s at such harsh in-vivo simulated environment by untethered control.

The above embodiments of the invention have provided a soft body robotic device and its making method. The robot includes a movement mechanism, preferably in the form of legs, which can lift the body from ground effectively and reduce the friction force 40 folds at least at dry condition. With the legged structure and the hydrophobic material, the robot can move on the wet surface efficiently and effectively. In the above embodiments, the movement of the robot can be readily regulated in a remote fashion by a dynamic magnetic field. Unlike existing approaches the robot of these embodiments employ both magnetic torque and pulling force as sources to drive the robot, leading to better adaptability to various surroundings. Under the trigger of external magnetic field, the exemplary robot can achieve a combined multiple locomotion, i.e., the combination of discontinuous flap-wave (DFW) locomotion and a continuous inverted-pendulum (CIP) locomotion.

In the above embodiment, materials that is degradable or have relatively poor mechanical properties can still be used in the manufacture of soft body robots that can function efficiently and effectively, with satisfactory movement performance. Also, the material requires of the making process is reduced. Any materials that meet the electrospinning requirements can be used. The manufacture process can be relatively simple and cheap, particularly suitable for mass production. The soft body robotic device in the above embodiments can be readily used in in vivo environment, e.g., for surgery or drug delivery, in both human and animal bodies.

It will be appreciated by persons skilled in the art that numerous variations and/or modifications may be made to the invention as shown in the specific embodiments without departing from the spirit or scope of the invention as broadly described. For example, the body of the robot can be made or processed to be in other shape and form, to suit particular applications. The form of the movement mechanism may differ from that illustrated. Solvent other than chloroform can be used in the manufacture of the robot body. The robot can be made smaller (e.g., nano, or pico scale), or bigger, as needed.

The described embodiments of the invention should therefore be considered in all respects as illustrative, not restrictive.

The invention claimed is:

1. A soft body robotic device, comprising:
   a body in the form of a generally planar film made of electrospun polylactic-acid-based fibers, the generally planar film including an upper surface and a lower surface; and
   a magnetic movement mechanism connected to the lower surface of the film, the magnetic movement mechanism being configured to support movement of the soft body robotic device and to interact with an external magnetic control device for movement of the soft body robotic device,
   wherein the magnetic movement mechanism comprises a plurality of magnetic legs on which the body is formed, the plurality of magnetic legs extending from the body and shaped to taper away from the body.

2. The soft body robotic device of claim 1, wherein the magnetic legs are paramagnetic.

3. The soft body robotic device of claim 1, wherein the magnetic legs extend generally perpendicular to the body.

4. The soft body robotic device of claim 1, wherein the magnetic legs are made from a polylactic-acid-based material.

5. The soft body robotic device of claim 4, wherein the polylactic-acid-based material comprises a solution containing polylactic acid, a solvent, and magnetic particles.

6. The soft body robotic device of claim 5, wherein the solvent comprises chloroform.

7. The soft body robotic device of claim 1, wherein the soft body robotic device is untethered.

8. The soft body robotic device of claim 1, wherein the soft body robotic device is degradable or biocompatible.

9. The soft body robotic device of claim 1, wherein the soft body robotic device is a milli-scale device or a micro-scale device.

10. The soft body robotic device of claim 1, wherein the body and the magnetic movement mechanism are integrally formed.

11. A soft body robotic device system comprising:
    a soft body robotic device and an external magnetic control device;
    wherein the soft body robotic device comprises
       a body in the form of a generally planar film made of electrospun polylactic-acid-based fibers, the generally planar film including an upper surface and a lower surface; and
       a magnetic movement mechanism connected to the lower surface of the film, the magnetic movement mechanism being configured to support movement of the soft body robotic device and to interact with the external magnetic control device for movement of the soft body robotic device, the magnetic movement mechanism comprising a plurality of magnetic legs on which the body is formed, the plurality of magnetic legs extending from the body and shaped to taper away from the body, and
    wherein the magnetic movement mechanism is configured to interact with the external magnetic control device to support discontinuous flap-wave locomotion and continuous inverted-pendulum locomotion of the soft body robotic device.

12. The soft body robotic device of claim 1, wherein a ratio of an average length of the magnetic legs to an average spacing between two adjacent magnetic legs is in the range of 1:2 to 2:1.

13. The soft body robotic device of claim 12, wherein the ratio of the average length of the magnetic legs to the average spacing between two adjacent magnetic legs is about 1.1.

* * * * *